United States Patent
Zhang et al.

(10) Patent No.: US 11,716,711 B2
(45) Date of Patent: Aug. 1, 2023

(54) TIME DOMAIN RESOURCE ALLOCATION FOR A TIME DOMAIN WAVEFORM

(71) Applicant: QUALCOMM Incorporated, San Diego, CA (US)

(72) Inventors: Xiaoxia Zhang, San Diego, CA (US); Jun Ma, San Diego, CA (US); Jing Sun, San Diego, CA (US); Wooseok Nam, San Diego, CA (US); Iyab Issam Sakhnini, San Diego, CA (US); Zhifei Fan, San Diego, CA (US); Tao Luo, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 17/249,751

(22) Filed: Mar. 11, 2021

(65) Prior Publication Data

US 2022/0295477 A1  Sep. 15, 2022

(51) Int. Cl.
*H04W 72/0446* (2023.01)
*H04L 27/04* (2006.01)
*H04L 27/26* (2006.01)

(52) U.S. Cl.
CPC ......... *H04W 72/0446* (2013.01); *H04L 27/04* (2013.01); *H04L 27/2605* (2013.01)

(58) Field of Classification Search
CPC . H04W 72/0446; H04L 27/04; H04L 27/2605
See application file for complete search history.

(56) References Cited

U.S. PATENT DOCUMENTS

| 2008/0232300 | A1* | 9/2008 | McCoy | H04L 25/0204 370/328 |
| 2010/0150114 | A1* | 6/2010 | Che | H04L 1/0026 370/336 |
| 2013/0315178 | A1* | 11/2013 | Lee | H04W 72/0406 370/329 |
| 2014/0204879 | A1* | 7/2014 | Yang | H04W 72/0413 370/329 |

(Continued)

FOREIGN PATENT DOCUMENTS

| EP | 3174258 A1 | 5/2017 |
| EP | 3309991 A1 | 4/2018 |

(Continued)

OTHER PUBLICATIONS

International Search Report and Written Opinion—PCT/US2022/070206—ISA/EPO—dated May 9, 2022.

*Primary Examiner* — Tejis Daya
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication of a time domain resource allocation (TDRA), in a unit of a time domain resource block (RB) or in a unit of a time domain RB group, for a communication that is to use a time domain waveform. The unit of the time domain RB or the unit of the time domain RB group may be a sub-symbol unit. The UE may communicate with the base station, using the time domain waveform, based at least in part on the TDRA for the communication. Numerous other aspects are described.

42 Claims, 11 Drawing Sheets

(56) References Cited

U.S. PATENT DOCUMENTS

| | | | |
|---|---|---|---|
| 2019/0020522 A1* | 1/2019 | Sun | H04L 27/2636 |
| 2019/0261315 A1* | 8/2019 | Zhang | H04W 8/24 |
| 2020/0170016 A1* | 5/2020 | Ji | H04W 72/0453 |
| 2020/0280983 A1 | 9/2020 | Huang et al. | |
| 2020/0314840 A1* | 10/2020 | Golitschek Edler Von Elbwart | H04L 5/0092 |
| 2020/0351934 A1 | 11/2020 | Khoshnevisan et al. | |
| 2020/0374852 A1 | 11/2020 | Khoshnevisan et al. | |
| 2022/0052824 A1* | 2/2022 | Kim | H04L 1/1854 |

FOREIGN PATENT DOCUMENTS

| | | | |
|---|---|---|---|
| WO | WO-2013018612 A1 * | 2/2013 | H04B 7/0452 |
| WO | 2020027587 A1 | 2/2020 | |
| WO | WO-2020052554 A1 | 3/2020 | |
| WO | 2020081662 A1 | 4/2020 | |

* cited by examiner

TIME DOMAIN RESOURCE ALLOCATION FOR A TIME DOMAIN WAVEFORM

FIELD OF THE DISCLOSURE

Aspects of the present disclosure generally relate to wireless communication and to techniques and apparatuses for time domain resource allocation for a time domain waveform.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: receive, from a base station, an indication of a time domain resource allocation (TDRA), in a unit of a time domain resource block (RB) or in a unit of a time domain RB group, for a communication that is to use a time domain waveform, wherein the unit of the time domain RB or the unit of the time domain RB group is a sub-symbol unit; and communicate with the base station, using the time domain waveform, based at least in part on the TDRA for the communication.

In some aspects, a base station for wireless communication includes a memory and one or more processors operatively coupled to the memory, the memory and the one or more processors configured to: transmit, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit; and communicate with the UE, using the time domain waveform, based at least in part on the TDRA for the communication.

In some aspects, a method of wireless communication performed by a UE includes receiving, from a base station, an indication of a TDRA, in a unit of a time domain RB or in a unit of a time domain RB group, for a communication that is to use a time domain waveform, wherein the unit of the time domain RB or the unit of the time domain RB group is a sub-symbol unit; and communicating with the base station, using the time domain waveform, based at least in part on the TDRA for the communication.

In some aspects, a method of wireless communication performed by a base station includes transmitting, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit; and communicating with the UE, using the time domain waveform, based at least in part on the TDRA for the communication.

In some aspects, an apparatus for wireless communication includes means for receiving, from a base station, an indication of a TDRA, in a unit of a time domain RB or in a unit of a time domain RB group, for a communication that is to use a time domain waveform, wherein the unit of the time domain RB or the unit of the time domain RB group is a sub-symbol unit; and means for communicating, using the time domain waveform, with the base station based at least in part on the TDRA for the communication.

In some aspects, an apparatus for wireless communication includes means for transmitting, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit; and means for communicating, using the time domain waveform, with the UE based at least in part on the TDRA for the communication.

In some aspects, a non-transitory computer-readable medium storing a set of instructions for wireless communication includes one or more instructions that, when executed by one or more processors of a UE, cause the UE to: receive, from a base station, an indication of a TDRA, in a unit of a time domain RB or in a unit of a time domain RB group, for a communication that is to use a time domain waveform, wherein the unit of the time domain RB or the unit of the time domain RB group is a sub-symbol unit; and communicate, using the time domain waveform, with the base station based at least in part on the TDRA for the communication.

In some aspects, a non-transitory computer-readable medium storing a set of instructions for wireless communication includes one or more instructions that, when executed by one or more processors of a base station, cause the base station to: transmit, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit; and communicate, using the time domain waveform, with the UE based at least in part on the TDRA for the communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
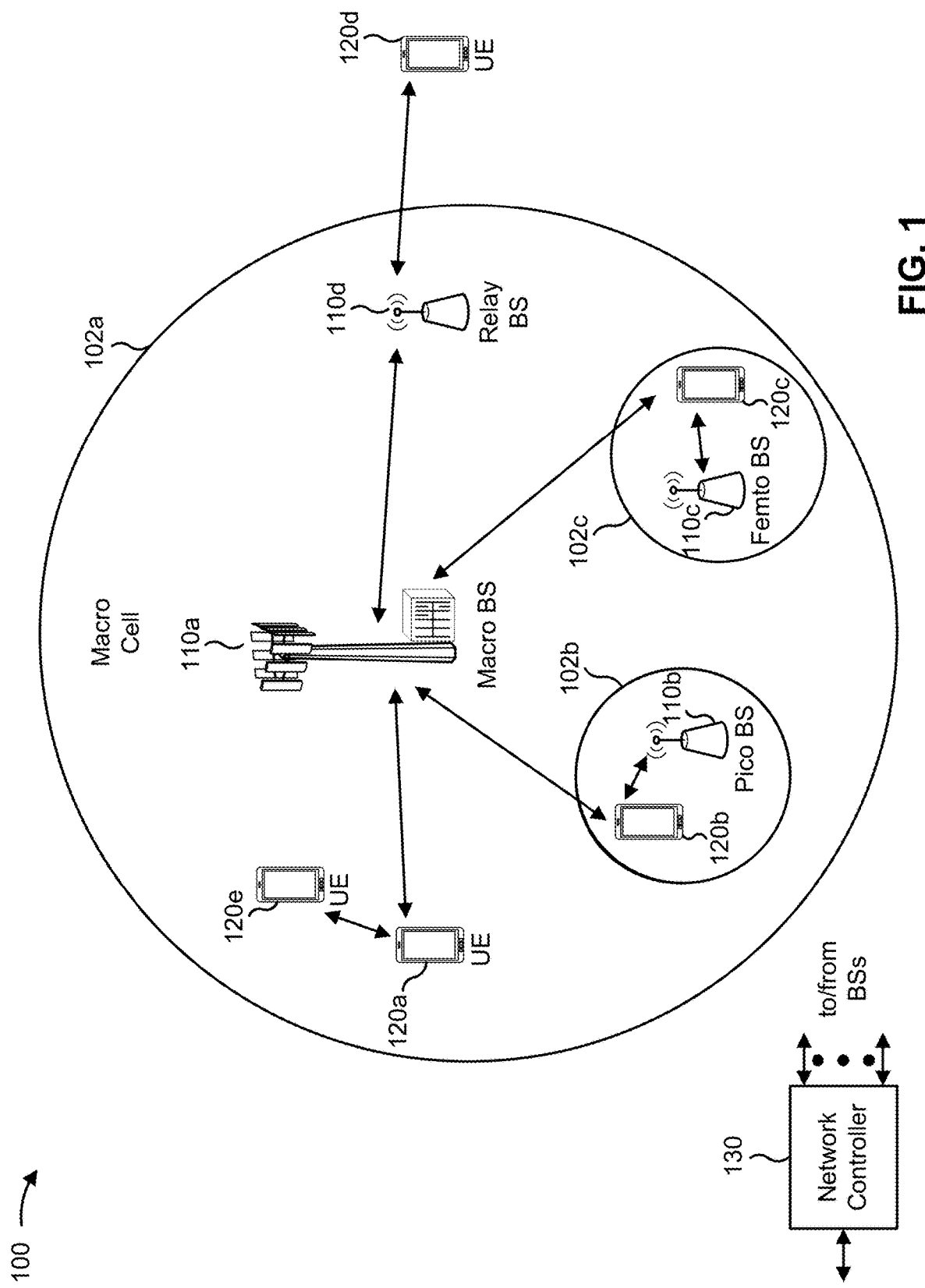
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
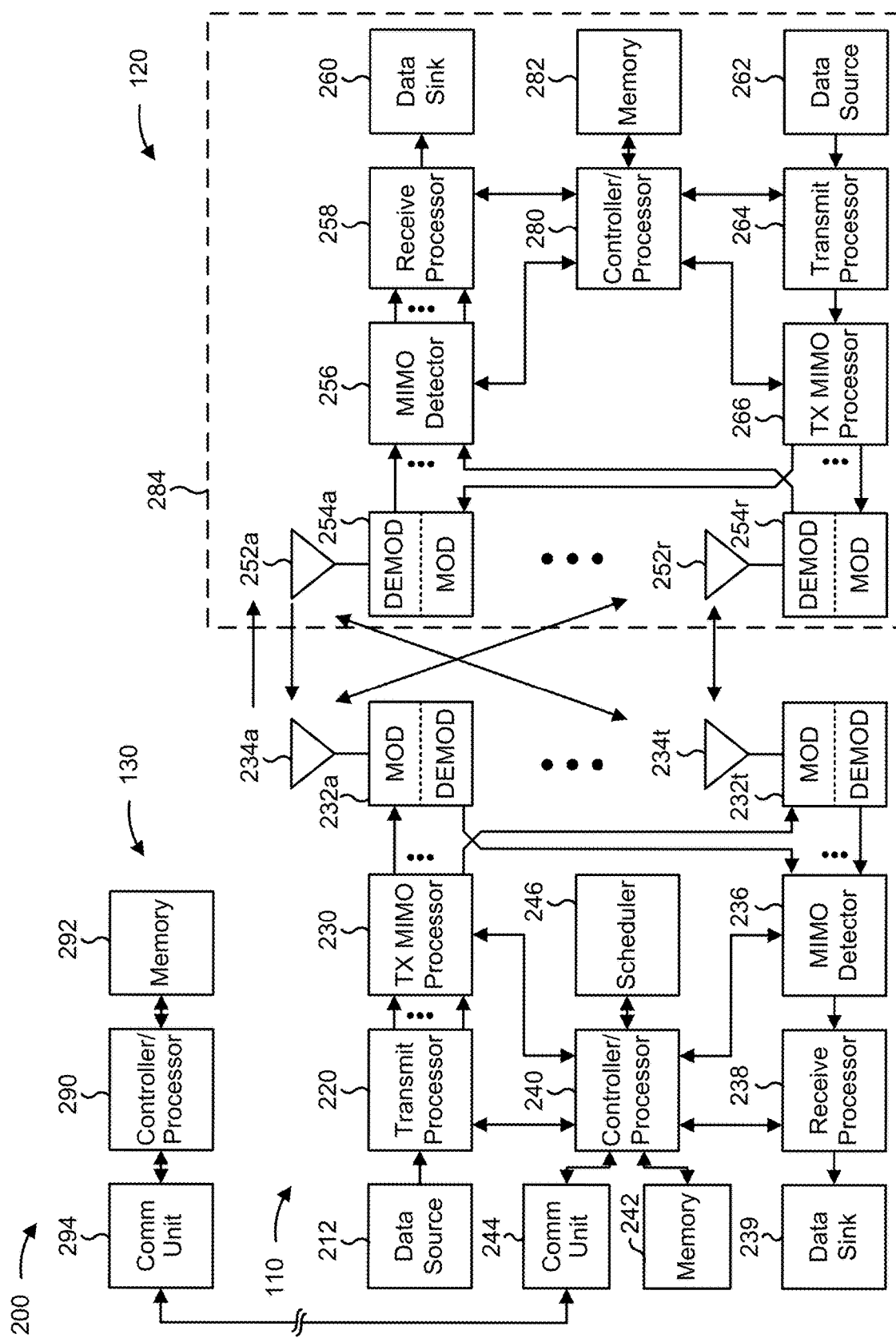
FIG. 2 is a diagram illustrating an example of abase station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, down convert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with time domain resource allocation for a time domain waveform, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving, from a base station, an indication of a time domain resource allocation (TDRA), in a unit of a time domain resource block (RB) or in a unit of a time domain RB group, for a communication that is to use a time domain waveform, wherein the unit of the time domain RB or the unit of the time domain RB group is a sub-symbol unit; and/or means for communicating with the base station, using the time domain waveform, based at least in part on the TDRA for the communication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining whether the TDRA is indicated in the unit of the time domain RB or in the unit of the time domain RB group, or in a symbol unit, based at least in part whether a start and length indicator value for the TDRA satisfies a threshold value.

In some aspects, the base station includes means for transmitting, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit; and/or means for communicating with the UE, using the time domain waveform, based at least in part on the TDRA for the communication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
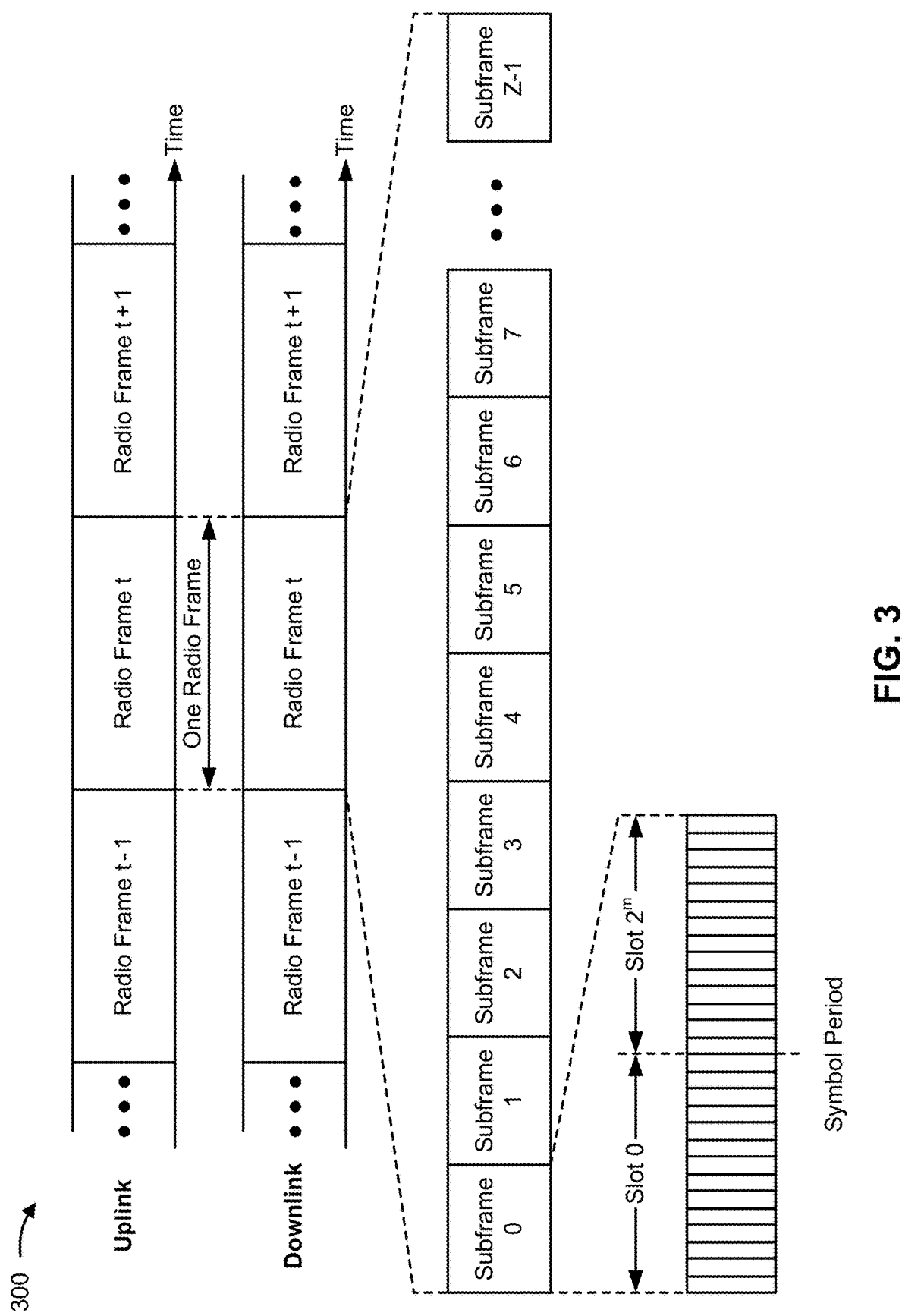
FIG. 3 is a diagram illustrating an example of a radio frame structure in a wireless communication network, in accordance with various aspects of the present disclosure.

FIG. 3 is a diagram illustrating an example 300 of a radio frame structure in a wireless communication network, in accordance with various aspects of the present disclosure. The radio frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a quantity of slots (e.g., $2^m$ slots per subframe are shown in FIG. 3, where m is an index of a numerology used for a transmission, such as 0, 1, 2, 3, 4, or another number). In a case where the index of the numerology is m=0, one subframe may include $2^0$=1 slots; whereas in a case where the numerology is m=1, one subframe may include $2^1$=2 slots. Each slot may include a quantity of L symbol (e.g., L=14), each with a specific symbol period. For example, each slot may include fourteen symbol periods (e.g., as shown in FIG. 3), seven symbol periods, or another number of symbol periods. In a case where the subframe includes one slot (e.g. when m=0), the subframe may include L=14 symbol periods, each with a duration of 66.67 μs (without cyclic prefix) and a 4.69 μs cyclic prefix duration. In a case where the subframe includes two slots (e.g., when m=1), the subframe may include 2L=2·14 symbol periods, each with a duration of 33.33 μs (without cyclic prefix) and a 2.34 μs cyclic prefix duration. For example, the 2L symbol periods in a subframe may be assigned indices of 0 through 2L−1. In some aspects, a scheduling unit for the FDD may be frame-based, subframe-based, slot-based, mini-slot based, or symbol-based.

As indicated above, FIG. 3 is provided as an example. Other examples may differ from what is described with respect to FIG. 3.

Figure 4:
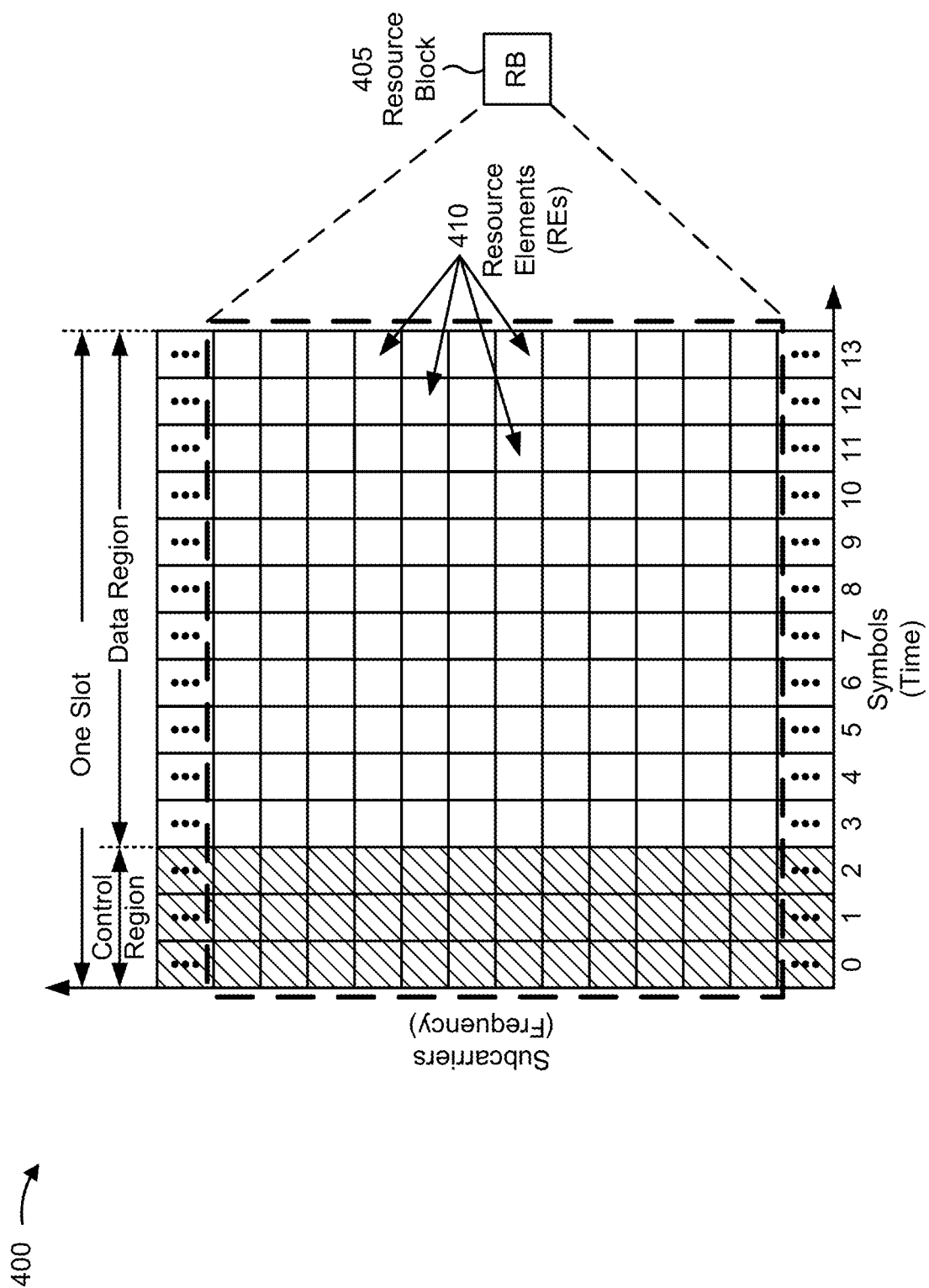
FIG. 4 is a diagram illustrating an example 400 of a resource grid, in accordance with various aspects of the present disclosure.

FIG. 4 is a diagram illustrating an example 400 of a resource grid, in accordance with various aspects of the present disclosure. As shown in FIG. 4, time-frequency resources in a radio access network may be partitioned into resource blocks, shown by a single RB 405. An RB 405 is sometimes referred to as a physical resource block (PRB). An RB 405 includes a quantity of subcarriers (e.g., 12 subcarriers) and a quantity of symbols (e.g., 14 symbols) that are schedulable by a base station 110 as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR) supporting plural numerologies, RBs 405 may span 12 subcarriers with a different subcarrier spacing of, for example, 15 kilohertz (kHz) (e.g., where the index of the numerology is m=0), 30 kHz (e.g., where the index of the numerology is m=1), 60 kHz (e.g., where the index of the numerology is m=2), 120 kHz (e.g., where the index of the numerology is m=3), or 240 kHz (e.g., where the index of the numerology is m=4), among other examples, over a 0.1 ms duration. For example, in a case where RBs 405 span 12 subcarriers with a subcarrier spacing of 60 kHz (e.g., where the index of the numerology is m=2), a radio frame may include 4 subframes and/or 40 slots with a period of 10 ms per radio frame. Consequently, each slot may have a duration of 0.25 ms. With fourteen symbol periods included in each slot, each symbol may have a duration of 16.67 μs (without cyclic prefix) and a 1.17 μs cyclic prefix duration. However, a slot period may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

In NR, a resource allocation for a UE may be provided in a unit of an RB and an OFDM/single carrier frequency division multiplexing (SC-FDM) symbol for both downlink and uplink communication, as described above. For example, for resource allocation type 0, the frequency domain resource assignment may be provided in a unit of an RB group. As another example, for resource allocation type 1, the frequency domain resource assignment may be in a unit of a single RB (e.g., 12 subcarriers). As a further example, in a time domain, a single shared channel (e.g., a physical downlink shared channel (PDSCH) or a physical uplink shared channel (PUSCH)) communication may span 2 to 14 symbols within one slot. Accordingly, time domain resource allocations and frequency domain resource allocations in NR have suitable granularity for user multiplexing.

Moreover, a UE may determine a transport block size for a communication based at least in part on a resource allocation for the communication. For example, the UE may determine a quantity of REs ($N_{RE}'$) allocated to a shared channel (e.g., a PDSCH or a PUSCH) within a PRB according to Equation 1:

$$N_{RE}' = N_{SC}^{RB} \cdot N_{symb}^{sh} - N_{DMRS}^{PRB} - N_{oh}^{PRB} \quad \text{Equation 1}$$

where $N_{sc}^{RB}$ is the quantity of subcarriers in an RB (e.g., 12), $N_{symb}^{sh}$ is the quantity of symbols assigned to the shared channel within a slot, $N_{DMRS}^{PRB}$ is the quantity of REs for a DMRS per PRB and inclusive of the overhead of the DMRS code division multiplexing (CDM) groups without data, and $N_{oh}^{PRB}$ is a higher-layer configured overhead parameter. The UE may determine a total quantity of REs ($N_{RE}$) allocated to the shared channel according to Equation 2:

$$N_{RE} = \min(156, N_{RE}') \cdot n_{PRB} \quad \text{Equation 2}$$

where $n_{PRB}$ is the total quantity of PRBs assigned to the UE. The UE may determine the transport block size for the shared channel based at least in part on the determined total quantity of REs ($N_{RE}$).

Similar to the OFDM/SC-FDM waveforms used in NR, as described above, it may also be desirable to employ user multiplexing within one symbol for communications that use a time domain waveform. A "time domain waveform" relates to a waveform that may span a specific bandwidth in the frequency domain (e.g., a configured bandwidth part) for a period of time (e.g., a symbol period) while a UE's traffic is modulated onto the waveform in the time domain. Such a use of modulating the waveform in the time domain facilitates multiplexing communications with different UEs within one symbol.

For example, a time domain waveform may include a waveform generated directly from modulation symbols (e.g., without use of a Discrete Fourier Transform (DFT) operation and/or a Fast Fourier Transform (FFT) operation), such as a single carrier quadrature amplitude modulation (SC-QAM) waveform. For a time domain waveform, frequency domain multiplexing can be achieved by configuring UEs with different bandwidth parts. That is, a UE's traffic may be communicated using a time domain waveform (e.g., the SC-QAM waveform) spanning an entire given bandwidth part in the frequency domain for one or more symbols (e.g., entire symbols) in the time domain (e.g., SC-QAM symbols). Thus, the granularity for user multiplexing is a bandwidth part in the frequency domain and one or more symbols (e.g., entire symbols) in the time domain.

Some techniques and apparatuses described herein provide improved time domain granularity for communications using a time domain waveform (e.g., an SC-QAM waveform). In some aspects, a UE may receive a TDRA, for a communication that is to use a time domain waveform, that is in a unit of a time domain RB or a unit of a time domain RB group. The time domain RB or the time domain RB group may be a sub-symbol unit. A sub-symbol unit may refer to a unit that is smaller than a symbol (e.g., an SC-QAM symbol). In other words, a duration of a time domain RB or a time domain RB group may be less than a duration of a symbol (e.g., an SC-QAM symbol). In a frequency domain, a time domain RB or a time domain RB group may span the bandwidth of a bandwidth part in which the UE is communicating. In some aspects, the UE may determine a transport block size for the communication based at least in part on the TDRA provided in time domain RBs or time domain RB groups.

In this way, a resource allocation for communicating with a single UE may have an improved granularity in the time domain. By the use of a time domain waveform (e.g., requiring waveform modulation in the time domain) a base station can also benefit from this improved granularity when communicating with different UEs. For example, the base station may perform scheduling of UEs and user multiplexing with greater flexibility and more efficiency, which in turn improves performance of the UEs and conserves network resources.

Figure 5:
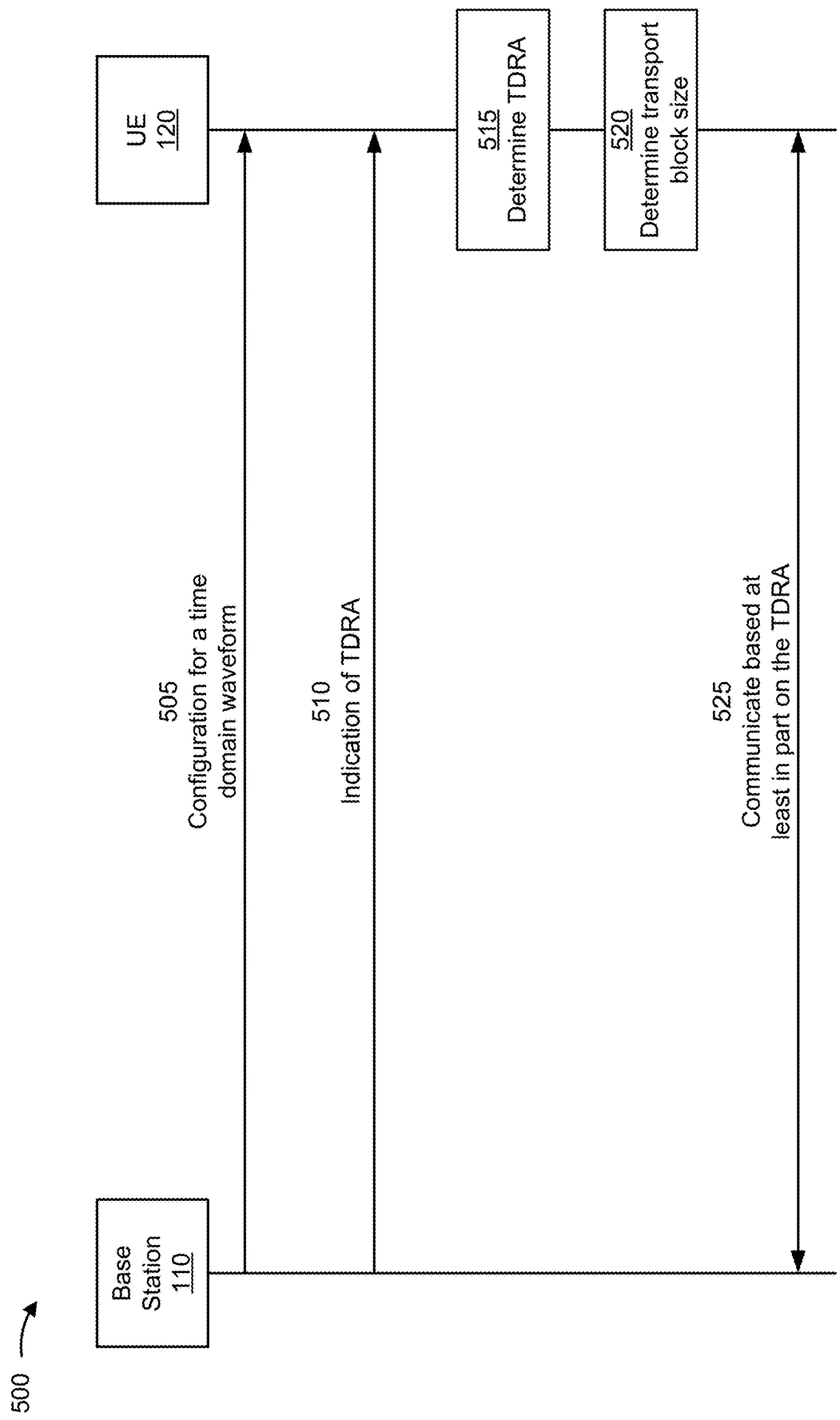
FIGS. 5-7 are diagrams illustrating examples associated with time domain resource allocation for a time domain waveform, in accordance with various aspects of the present disclosure.

FIG. 5 is a diagram illustrating an example 500 associated with time domain resource allocation for a time domain waveform, in accordance with various aspects of the present disclosure. As shown in FIG. 5, example 500 includes communication between a base station 110 and a UE 120. In some aspects, the base station 110 and the UE 120 may be included in a wireless network, such as the wireless network 100. The base station 110 and the UE 120 may communicate via a wireless access link, which may include an uplink and a downlink.

As shown by reference number 505, the base station 110 may transmit, and the UE 120 may receive, a configuration for a time domain waveform. For example, the configuration may indicate that the UE 120 is to communicate with the base station 110 using the time domain waveform. As an example, using the time domain waveform for communication includes modulating the waveform in the time domain. In some aspects, the time domain waveform is an SC-QAM waveform. In some aspects, the configuration for the time domain waveform may be included in a radio resource control (RRC) message, a medium access control (MAC) control element (MAC-CE), and/or downlink control information (DCI), among other examples. In some aspects, the base station 110 may transmit to the UE 120 an indication of a bandwidth part in which the UE 120 is to communicate.

In some aspects, the base station 110 may transmit to the UE 120 an additional configuration for the units that are to be used for a resource allocation. For example, the units may be sub-symbol units such as time domain RBs or time domain RB groups, as described below. In some aspects, the additional configuration may be included in the same message (e.g., the RRC message, the MAC-CE, and/or the DCI) as the configuration for the time domain waveform, or in a different message.

As shown by reference number 510, the base station 110 may transmit, and the UE 120 may receive, an indication of a TDRA for the UE 120. In some aspects, the TDRA may be for a shared channel (e.g., a PDSCH or a PUSCH) or a control channel (e.g., a physical uplink control channel (PUCCH)). In some aspects, the TDRA may be associated with a dynamic grant, a semi-persistent scheduling configuration, and/or a configured grant, among other examples. In some aspects, the indication of the TDRA may be included in DCI (e.g., in a TDRA field), a MAC-CE, or an RRC message.

The TDRA may be for a communication that is to use a time domain waveform (e.g., according to the configuration for the time domain waveform, as described above). In some aspects, the TDRA may be in a unit of a time domain RB or in a unit of a time domain RB group. That is, the TDRA may be in a sub-symbol unit (e.g., a unit smaller than a symbol in duration). For example, each slot may include a quantity of symbols (K, for example, K=14), and each symbol (e.g., SC-QAM symbol) may include a quantity (M, for example, M=2, 3, 4, or another number) of multiple time domain RBs (e.g., values of K and M may be defined or may be configured for the UE 120). Thus, the quantity of time domain RBs in a slot is the product of K and M. In addition, each time domain RB may include a quantity of time domain REs (N) (e.g., a value of N may be defined or may be configured for the UE 120).

For example, each slot may include a quantity (J) of time domain RB groups. A time domain RB group may include a group of multiple time domain RBs similar as defined above. In some aspects, a size of a time domain RB group (e.g., a quantity of time domain RBs included in a time domain RB group) may be based at least in part on a size of a bandwidth part (e.g., the bandwidth part configured for the UE 120). For example, a larger BWP (e.g., having a larger bandwidth) may be associated with a larger time domain RB group size, and a smaller BWP (e.g., having a smaller bandwidth) may be associated with a smaller time domain RB group size.

In some aspects, the TDRA may identify one or more time domain RBs and/or one or more time domain RB groups. In some aspects, the TDRA may identify multiple contiguous (e.g., in time) time domain RBs and/or multiple contiguous time domain RB groups. For example, the TDRA may identify multiple contiguous physical time domain RBs or multiple contiguous time domain virtual RBs (e.g., that map to non-contiguous physical time domain RBs), as further described below in connection with FIG. 7. In some aspects, the TDRA is based at least in part on a quantity of symbols included in a slot, a quantity of time domain RBs included in a symbol of the quantity of symbols, a starting time domain RB for the TDRA, and/or a quantity of consecutive time domain RBs for the TDRA. In some other aspects, the TDRA is based at least in part on a quantity of time domain RB groups included in a slot, a starting time domain RB group for the TDRA, and/or a quantity of consecutive time domain RB groups for the TDRA.

The TDRA may be indicated by an indicator. For example, the indicator can be a start and length indicator value (SLIV) (e.g., the indication of the TDRA may be the SLIV), which defines the starting time domain RB or RB group and the quantity of consecutive time domain RBs or RB groups for the TDRA. In some aspects, the SLIV may be based at least in part on time domain RBs. The SLIV (e.g., as modified for use with K×M time domain RBs in a slot) may be based at least in part on a quantity of symbols (K) included in a slot, a quantity of time domain RBs (M) included in a symbol of the quantity of symbols, a starting time domain RB (S) for the TDRA (e.g., relative to a slot boundary), and/or a quantity of consecutive time domain RBs (L) for the TDRA (e.g., the quantity of consecutive time domain RBs assigned to the UE 120 or channel). For example, if the TDRA is less than or equal to half of a slot (e.g., $(L-1) \leq (K \times M/2)$), then the SLIV may be defined according to Equation 3:

$$\text{SLIV} = K \cdot M \cdot (L-1) + S \quad\quad\quad \text{Equation 3}$$

Otherwise, if the TDRA is greater than half of a slot (e.g., $(L-1) > (K \times M/2)$), then the SLIV may be defined according to Equation 4:

$$\text{SLIV} = K \cdot M \cdot (K \cdot M - L + 1) + (K \cdot M - 1 - S) \quad\quad\quad \text{Equation 4}$$

In other words, the base station 110 may indicate the SLIV based at least in part on Equation 3 or Equation 4 or variations thereof, and the UE 120 may determine a start and length of the TDRA, from the indicated SLIV, based at least in part on Equation 3 or Equation 4 or variations thereof. In some other aspects, the UE 120 may determine a start and length of the TDRA by mapping the indicated SLIV to a look-up table. In some examples, the UE 120 may receive, from the base station 110, a configuration for the look-up table.

In some aspects, the SLIV may be based at least in part on time domain RB groups. The SLIV (e.g., as modified for use with J time domain RB groups in a slot) may be based at least in part on a quantity of time domain RB groups (J) included in a slot, a starting time domain RB group (S) for the TDRA (e.g., relative to a slot boundary), and/or a quantity of consecutive time domain RB groups (L) for the TDRA (e.g., the quantity of consecutive time domain RB groups assigned to the UE 120 or channel). For example, if the TDRA is less than or equal to half of a slot (e.g., $(L-1) \leq J/2$), then the SLIV may be defined according to Equation 5:

$$\text{SLIV} = J \cdot (L-1) + S \quad\quad\quad \text{Equation 5}$$

Otherwise, if the TDRA is greater than half of a slot (e.g., $(L-1) > J/2$), then the SLIV may be defined according to Equation 6:

$$\text{SLIV} = J \cdot (J - L + 1) + (J - 1 - S) \quad\quad\quad \text{Equation 6}$$

In other words, the base station 110 may indicate the SLIV based at least in part on Equation 5 or Equation 6 or variations thereof, and the UE 120 may determine a start and length of the TDRA, from the indicated SLIV, based at least in part on Equation 5 or Equation 6 or variations thereof. In some other aspects, the UE 120 may determine a start and length of the TDRA by mapping the indicated SLIV to a look-up table. In some examples, the UE 120 may receive, from the base station 110, a configuration for the look-up table.

As shown by reference number 515, the UE 120 may determine the TDRA indicated by the SLIV. For example, the UE 120 may determine a starting time domain RB or time domain RB group, and a length of consecutive time domain RBs or time domain RB groups, for the TDRA based at least in part on the SLIV.

In some aspects, the UE 120 may determine whether the SLIV indicates the TDRA in units of time domain RBs or in units of time domain RB groups (i.e., time domain RB/RB group granularity) or in units of symbols (i.e., symbol granularity).

In some aspect, the SLIV may indicate the TRDA in units of time domain RBs/RB groups or symbols based at least in part on a resource allocation type for which the TDRA is indicated. For example, when a TRDA is indicated for a resource allocation type 0 (or type 1), the SLIV may be interpreted in units of symbols. When a TRDA is indicated for a resource allocation type 0A (or type 1B), the SLIV may be interpreted in units of time domain RB groups. Whereas, when a TRDA is indicated for a resource allocation type 1A (or type 0B), the SLIV may be interpreted in units of time domain RBs.

In some aspects, the SLIV may indicate the TDRA in units of time domain RBs/RB groups or in units of symbols based at least in part on whether the length (L) of the TDRA satisfies a threshold value (P). In some examples, the threshold value (P) may have a value that is configured for the UE 120, such as a value that is less than half of a slot. For example, if L≤P, then the SLIV may be in units of time domain RBs/RB groups, and if L>P, then the SLIV may be in units of symbols. Fractional symbol assignment (e.g., sub-symbol assignment) may not be used (or needed) when the quantity of contiguous time domain RBs/RB groups exceeds the threshold value.

In some aspects, a first set of SLIVs may be associated with time domain RB/RB group granularity and a second set of SLIVs may be associated with symbol granularity. For example, if the length of the TDRA is less than or equal to the threshold value (e.g., L≤P≤J/2), then the SLIV may be defined according to Equation 5 above, where the SLIV is less than J×P. Otherwise, if the length of the TDRA is greater than the threshold value (e.g., L>P), then the SLIV may be defined according to Equation 7:

$$SLIV = J \cdot P + SLIV_{R16}$$ Equation 7 where $SLIV_{R16}$ corresponds to a SLIV that is based at least in part on a quantity of symbols included in a slot (e.g., 14 symbols), a starting symbol, and/or a quantity of consecutive symbols (e.g., a SLIV computation with symbol level granularity according to 3GPP Release 16).

Accordingly, the UE 120 may determine whether the TDRA is indicated in units of time domain RBs or time domain RB groups, or indicated in symbol units, based at least in part whether the SLIV satisfies another threshold value (e.g., J×P). For example, if the SLIV is greater than the other threshold value (e.g., SLIV>J×P), then the UE 120 may interpret the SLIV according to Equation 7 above in order to determine $SLIV_{R16}$ (e.g., which indicates the TDRA in a unit of a symbol). As another example, if the SLIV is less than or equal to the other threshold value (e.g., SLIV≤J× P), then the UE 120 may interpret the SLIV according to Equation 5 above (e.g., which indicates the TDRA in a unit of a time domain RB or a time domain RB group). In some aspects, the base station 110 may transmit (e.g., with the indication of the TDRA) an indication of whether a SLIV is to indicate a TDRA in accordance with time domain RB/RB group granularity or in accordance with symbol granularity.

It should be noted that although determination of a SLIV, which defines the starting time domain RB or RB group and the quantity of consecutive time domain RBs or RB groups for the TDRA, is illustrated above with reference to Equations 3-7, this is for illustration rather than limitation. One can readily appreciate that other means can also be applied to determine the starting time domain RB or RB group and the number of consecutive RBs or RB groups for the TDRA.

As shown by reference number 520, the UE 120 may determine a transport block size for the communication. In some aspects, the transport block size may be based at least in part on a quantity of time domain resource elements included in a time domain RB and/or a quantity of time domain RBs or time domain RB groups indicated by the TDRA. For example, a time domain resource element (RE) may be uniquely identified by (k,l), where k is an index in frequency domain, and l refers to a time domain RB or a time domain RB group, respectively. In some aspects, the UE 120 may determine a total quantity of time domain REs ($N_{RE}$) allocated to the communication (e.g., to the shared channel) according to Equation 8:

$$N_{RE} = N_{RE}^{RB} \cdot N_{RB}^{sh} - N_{DMRS} - N_{OH}$$ Equation 8 where $N_{RE}^{RB}$ corresponds to the quantity of time domain REs in a time domain RB (or N, as described above), $N_{RB}^{sh}$ corresponds to the quantity of time domain RBs assigned (e.g., by the TDRA) to the communication (e.g., the shared channel), $N_{DMRS}$ corresponds to the total quantity of DMRS modulation symbols within the TDRA, and $N_{OH}$ corresponds to the total quantity of overhead modulation symbols within the TDRA. The UE 120 may determine the transport block size based at least in part on the total quantity of time domain REs ($N_{RE}$), in a similar manner as described above.

In some examples, the TDRA in sub-symbol units may not include additional (e.g., different) cyclic prefix modulation symbol(s) and/or additional (e.g., different) guard interval modulation symbol(s). For example, for symbol-level processing, only one cyclic prefix modulation symbol and/or one guard interval modulation symbol is inserted within the symbol even when the TDRA in sub-symbol units is used. In such a case, Equation 8 may be used, as discussed before.

In other examples, the TDRA may include one or more cyclic prefixes for the sub-symbol unit within a symbol. That is, the TDRA may include one or more additional cyclic prefix modulation symbol(s) within a symbol (e.g., in addition to cyclic prefix modulation symbols for symbol-level processing, as described below in connection with FIG. 6). Additionally, or alternatively, the TDRA may include one or more guard intervals for the sub-symbol unit within a symbol. That is, the TDRA may include one or more additional guard interval modulation symbol(s) within a symbol (e.g., in addition to guard interval modulation symbols for symbol-level processing, as described below in connection with FIG. 6). For example, the additional cyclic prefix modulation symbols and/or the additional guard interval modulation symbols may be needed to enable intra-symbols users and/or channel multiplexing for fractional symbol assignments (e.g., sub-symbol assignments).

In some aspects, the transport block size may be based at least in part on one or more cyclic prefixes for the sub-symbol unit (e.g., the one or more additional cyclic prefix modulation symbols) within a symbol or one or more guard intervals for the sub-symbol unit (e.g., the one or more additional guard interval modulation symbols) within a symbol. For example, $N_{OH}$ in Equation 8 above may include the quantity of the additional cyclic prefix modulation symbol(s) and/or the quantity of the additional guard interval modulation symbol(s). As another example, the UE 120 may determine the total quantity of time domain REs ($N_{RE}$) allocated to the communication (e.g., to the shared channel) according to Equation 9:

$$N_{RE}=N_{RE}^{RB} \cdot N_{RB}^{sh} - N_{DMRS} - N_{Add} - N_{OH} \qquad \text{Equation 9}$$

where $N_{RE}^{RB}$, $N_{RB}^{sh}$, $N_{DMRS}$, and $N_{OH}$ are as described above for Equation 8, and $N_{Add}$ corresponds to the total quantity of additional cyclic prefix and/or guard interval modulation symbols within the TDRA.

In some aspects, the base station 110 also may determine the transport block size for the communication, in a similar manner as described above. In some example channel/user multiplexing designs, cyclic prefixes and/or guard intervals for the sub-symbol unit (e.g., additional cyclic prefix and/or guard interval modulation symbols) may not be used. In some aspects, the base station 110 may transmit an indication of whether the UE 120 is to use additional cyclic prefixes and/or guard intervals for the sub-symbol unit (e.g., additional cyclic prefix and/or guard interval modulation symbols).

As shown by reference number 525, the UE 120 and the base station 110 may communicate based at least in part on the TDRA for the communication using the time domain waveform. Additionally, the UE 120 and the base station 110 may communicate based at least in part on the transport block size. In some aspects, the UE 120 may transmit the communication to the base station 110 in the TDRA (e.g., the communication may be for a PUSCH or a PUCCH). In some aspects, the UE 120 may receive the communication from the base station 110 in the TDRA (e.g., the communication may be for a PDSCH). In some aspects, the communication may use a time domain waveform. In this way, the use of sub-symbol units for the TDRA facilitates flexible user multiplexing and efficient use of network resources.

As indicated above, FIG. 5 is provided as an example. Other examples may differ from what is described with respect to FIG. 5.

Figure 6:
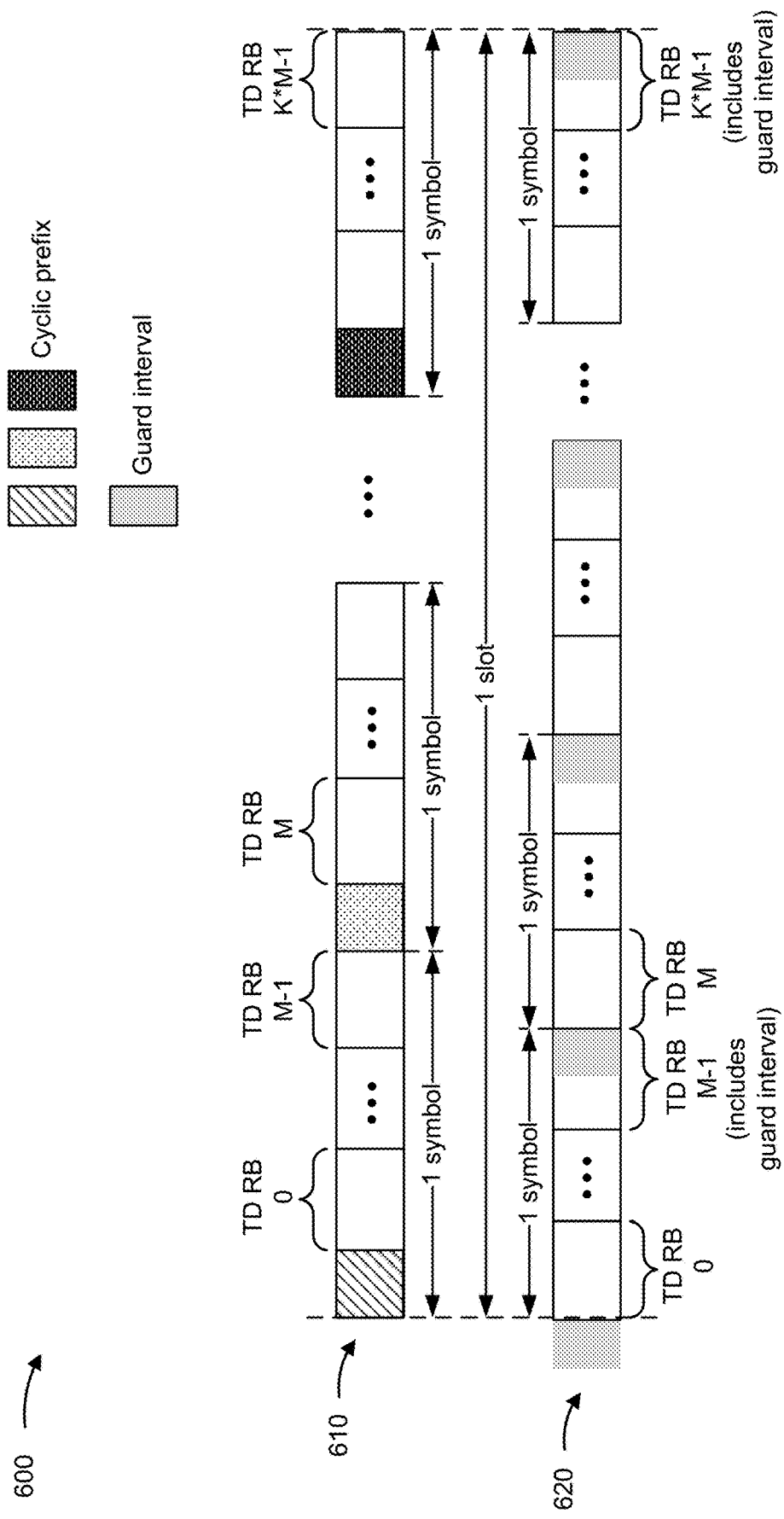

FIG. 6 is a diagram illustrating an example 600 associated with time domain resource allocation for a time domain waveform, in accordance with various aspects of the present disclosure.

In some aspects, time domain RBs (e.g., the K×M time domain RBs in a slot) may not include cyclic prefix modulation symbols. In other words, cyclic prefixes may not be included in the time domain RB assignment of a TDRA. As shown by reference number 610, cyclic prefixes may be inserted within each symbol of a slot (e.g., at respective beginnings of each symbol). In addition, the cyclic prefixes for each symbol may be different (e.g., the cyclic prefixes for each symbol may include different waveforms). The cyclic prefixes may be used for symbol-level processing. As shown, the time domain RBs in a symbol may not include the cyclic prefix in the symbol.

In some aspects, time domain RBs (e.g., the K×M time domain RBs in a slot) may include guard interval modulation symbols. In other words, guard intervals may be included in the time domain RB assignment of a TDRA. As shown by reference number 620, guard intervals may be inserted within each symbol of a slot (e.g., at respective ends of each symbol). In addition, the guard intervals may be common to each symbol (e.g., the guard intervals for each symbol may include the same waveform). The guard intervals may be used for symbol-level processing. As shown, a time domain RB in a symbol may include the guard interval in the symbol.

Accordingly, the quantity of symbols (K) included in a slot and/or the quantity of time domain RBs (M) included in a symbol, when cyclic prefix insertion is used, may be different from the quantity of symbols (K) included in a slot and/or the quantity of time domain RBs (M) included in a symbol when guard interval insertion is used. Thus, the quantity of time domain REs (N) included in a time domain RB, when cyclic prefix insertion is used, may be different from the quantity of time domain REs (N) included in a time domain RB when guard interval insertion is used.

As indicated above, FIG. 6 is provided as an example. Other examples may differ from what is described with respect to FIG. 6.

Figure 7:
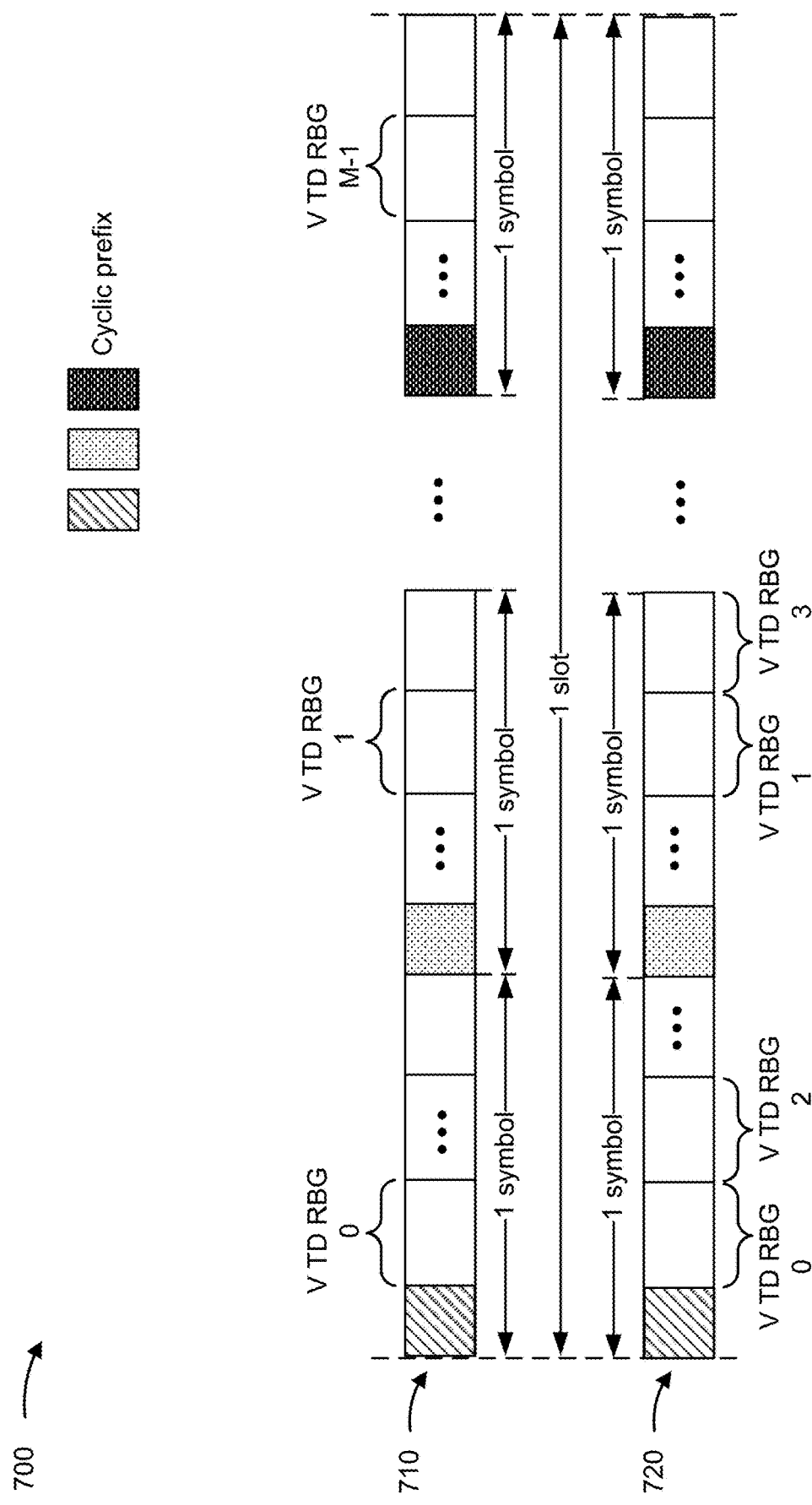

FIG. 7 is a diagram illustrating an example 700 associated with time domain resource allocation for a time domain waveform, in accordance with various aspects of the present disclosure. As described above, a TDRA (e.g., indicated by a SLIV) may include contiguous (in time) time domain RBs or RB groups. In some aspects, the contiguous time domain RBs or RB groups are virtual time domain RBs or RB groups that map to non-contiguous (in time) physical time domain RBs or physical time domain RB groups. In some aspects, different TRPs (e.g., different cells) may be associated with different mappings of time domain virtual RB or RB groups to physical time domain RBs or physical time domain RB groups.

As shown by reference number 710, in an example, the UE 120 may be assigned (e.g., according to a TDRA) virtual time domain RB groups (shown as "V TD RBG") 0 through M−1 (which are contiguous). These virtual time domain RB groups may map to non-contiguous physical time domain RB groups as shown. Additional beam switching gaps and/or DMRS overhead may be needed in connection with the non-contiguous physical time domain RB groups. The non-contiguous physical time domain RB groups may improve interference diversity.

In some aspects, contiguous virtual time domain RBs or RB groups may map to non-contiguous physical time domain RB or RB group segments. Here, a physical time domain RB or RB group segment may include multiple contiguous physical time domain RBs or RB groups. In other words, a TDRA in virtual time domain RBs or RB groups may map to an allocation of relatively fewer segments of contiguous physical time domain RBs or RB groups.

As shown by reference number 720, in an example, the UE 120 may be assigned (e.g., according to a TDRA) virtual time domain RB groups 0 through 3 (which are contiguous). As shown, virtual time domain RB groups 0 and 2 may map to a first physical time domain RB group segment of contiguous physical time domain RB groups, and virtual time domain RB groups 1 and 3 may map to a second physical time domain RB group segment of contiguous physical time domain RB groups. As shown, the first physical time domain RB group segment and the second physical time domain RB group segment may be non-contiguous. In this way, the physical time domain RB group segments may reduce beam switching gaps and/or DMRS overhead while providing interference diversity.

As indicated above, FIG. 7 is provided as an example. Other examples may differ from what is described with respect to FIG. 7.

Figure 8:
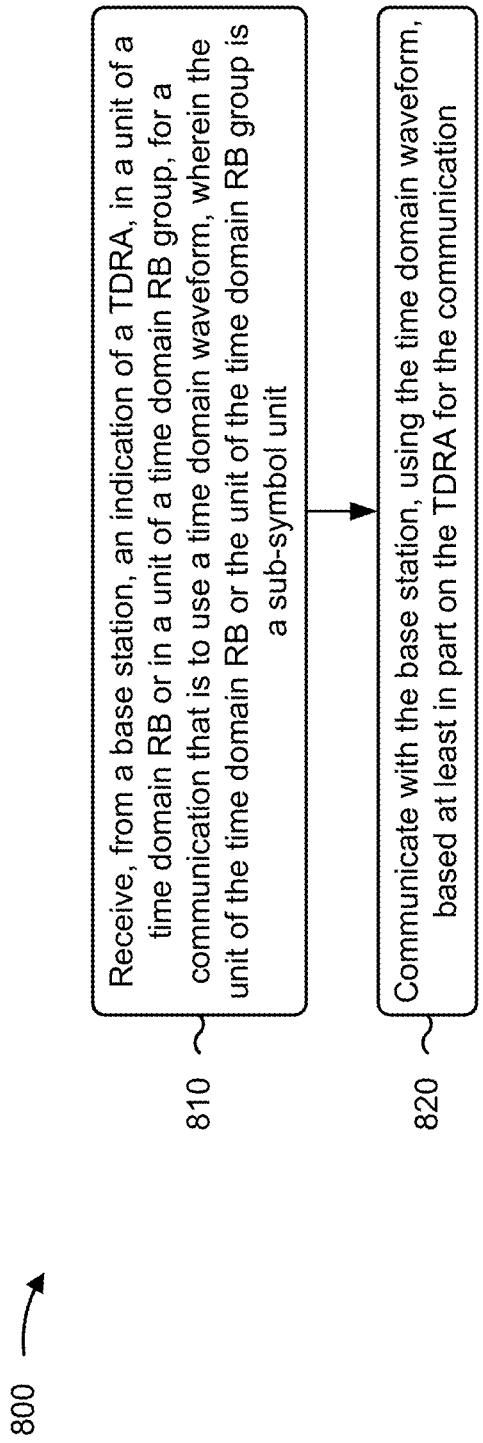
FIGS. 8-9 are diagrams illustrating example processes associated with time domain resource allocation for a time domain waveform, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with time domain resource allocation for a time domain waveform.

As shown in FIG. 8, in some aspects, process 800 may include receiving, from a base station, an indication of a TDRA, in a unit of a time domain RB or in a unit of a time domain RB group, for a communication that is to use a time domain waveform, wherein the unit of the time domain RB or the unit of the time domain RB group is a sub-symbol unit (block 810). For example, the UE (e.g., using reception component 1002, depicted in FIG. 10) may receive, from a base station, an indication of a TDRA, in a unit of a time domain RB or in a unit of a time domain RB group, for a communication that is to use a time domain waveform, as described above. In some aspects, the unit of the time domain RB or the unit of the time domain RB group is a sub-symbol unit.

As further shown in FIG. 8, in some aspects, process 800 may include communicating with the base station, using the time domain waveform, based at least in part on the TDRA for the communication (block 820). For example, the UE (e.g., using reception component 1002 and/or transmission component 1004, depicted in FIG. 10) may communicate with the base station, using the time domain waveform, based at least in part on the TDRA for the communication, as described above.

Process 800 may include additional aspects, such as any single aspect or any combination of aspects described below and/or in connection with one or more other processes described elsewhere herein.

In a first aspect, the time domain waveform is an SC-QAM waveform.

In a second aspect, alone or in combination with the first aspect, the unit of the time domain RB includes a plurality of time domain resource elements.

In a third aspect, alone or in combination with one or more of the first and second aspects, the TDRA includes contiguous time domain RBs or contiguous time domain RB groups.

In a fourth aspect, alone or in combination with one or more of the first through third aspects, a size of the unit of the time domain RB group is based at least in part on a size of a bandwidth part.

In a fifth aspect, alone or in combination with one or more of the first through fourth aspects, the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

In a sixth aspect, alone or in combination with one or more of the first through fifth aspects, the TDRA is based at least in part on a quantity of time domain RB groups included in a slot, a starting time domain RB group for the TDRA, and a quantity of consecutive time domain RB groups for the TDRA.

In a seventh aspect, alone or in combination with one or more of the first through sixth aspects, the TDRA is indicated by a start and length indicator value that indicates a starting time domain RB or a starting time domain RB group, and a quantity of consecutive time domain RBs or a quantity of consecutive time domain RB groups, for the TDRA.

In an eighth aspect, alone or in combination with one or more of the first through seventh aspects, the indication of the TDRA in the unit of the time domain RB or in the unit of the time domain RB group is based at least in part on a length of the TDRA being less than a threshold value.

In a ninth aspect, alone or in combination with one or more of the first through eighth aspects, process 800 includes determining whether the TDRA is indicated in the unit of the time domain RB or in the unit of the time domain RB group, or in a symbol unit, based at least in part whether a start and length indicator value for the TDRA satisfies a threshold value.

In a tenth aspect, alone or in combination with one or more of the first through ninth aspects, the TDRA includes contiguous virtual time domain RBs or contiguous virtual time domain RB groups that map to non-contiguous physical time domain RBs or to non-contiguous physical time domain RB groups.

In an eleventh aspect, alone or in combination with one or more of the first through tenth aspects, the unit of the time domain RB or the unit of the time domain RB group does not include cyclic prefix modulation symbols.

In a twelfth aspect, alone or in combination with one or more of the first through eleventh aspects, the unit of the time domain RB or the unit of the time domain RB group includes guard interval modulation symbols.

In a thirteenth aspect, alone or in combination with one or more of the first through twelfth aspects, a transport block size for the communication is based at least in part on a quantity of time domain resource elements included in the unit of the time domain RB and a quantity of time domain RBs or a quantity of time domain RB groups indicated by the TDRA.

In a fourteenth aspect, alone or in combination with one or more of the first through thirteenth aspects, the TDRA includes one or more cyclic prefixes for the sub-symbol unit within a symbol or one or more guard intervals for the sub-symbol unit within a symbol.

In a fifteenth aspect, alone or in combination with one or more of the first through fourteenth aspects, a transport block size for the communication is based at least in part on one or more cyclic prefixes for the sub-symbol unit within a symbol or one or more guard intervals for the sub-symbol unit within a symbol.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
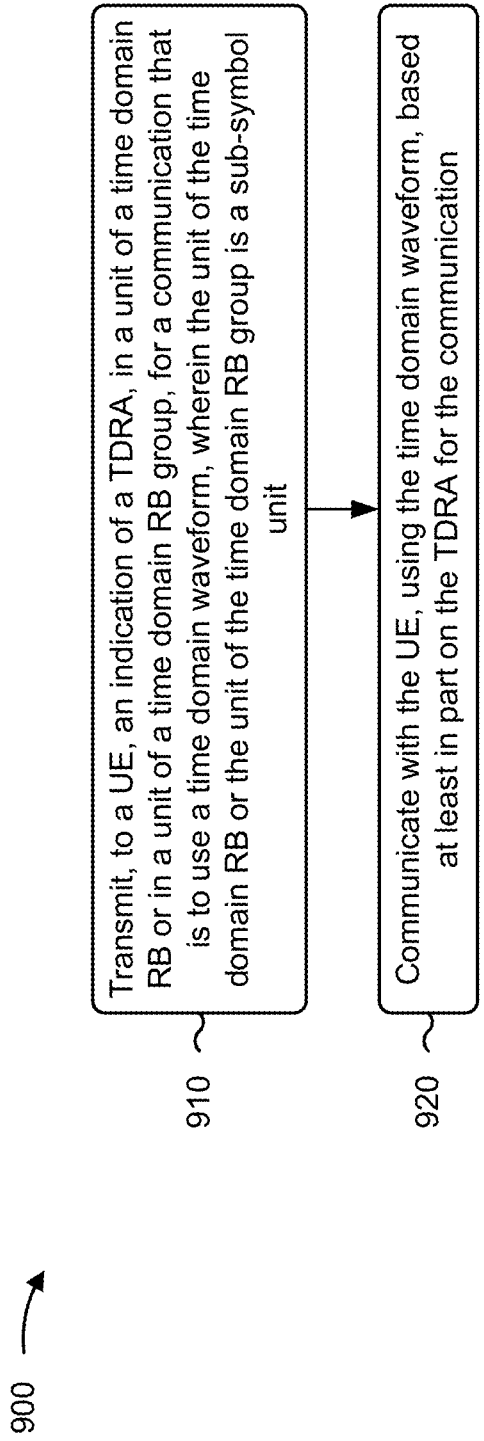

FIG. 9 is a diagram illustrating an example process 900 performed, for example, by a base station, in accordance with various aspects of the present disclosure. Example process 900 is an example where the base station (e.g., base station 110) performs operations associated with time domain resource allocation for a time domain waveform.

As shown in FIG. 9, in some aspects, process 900 may include transmitting, to a UE, an indication of a TDRA, in a unit of a time domain RB or in a unit of a time domain RB group, for a communication that is to use a time domain waveform, wherein the unit of the time domain RB or the unit of the time domain RB group is a sub-symbol unit (block 910). For example, the base station (e.g., using transmission component 1104, depicted in FIG. 11) may transmit, to a UE, an indication of a TDRA, in a unit of a time domain RB or in a unit of a time domain RB group, for a communication that is to use a time domain waveform, as described above. In some aspects, the unit of the time domain RB or the unit of the time domain RB group is a sub-symbol unit.

As further shown in FIG. 9, in some aspects, process 900 may include communicating with the UE, using the time domain waveform, based at least in part on the TDRA for the communication (block 920). For example, the base station (e.g., using reception component 1102 and/or transmission component 1104, depicted in FIG. 11) may communicate with the UE, using the time domain waveform, based at least in part on the TDRA for the communication, as described above.

Process 900 may include additional aspects, such as any single aspect or any combination of aspects described below and/or in connection with one or more other processes described elsewhere herein.

In a first aspect, the time domain waveform is an SC-QAM waveform.

In a second aspect, alone or in combination with the first aspect, the unit of the time domain RB includes a plurality of time domain resource elements.

In a third aspect, alone or in combination with one or more of the first and second aspects, the TDRA includes contiguous time domain RBs or contiguous time domain RB groups.

In a fourth aspect, alone or in combination with one or more of the first through third aspects, a size of the unit of the time domain RB group is based at least in part on a size of a bandwidth part.

In a fifth aspect, alone or in combination with one or more of the first through fourth aspects, the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

In a sixth aspect, alone or in combination with one or more of the first through fifth aspects, the TDRA is based at least in part on a quantity of time domain RB groups included in a slot, a starting time domain RB group for the TDRA, and a quantity of consecutive time domain RB groups for the TDRA.

In a seventh aspect, alone or in combination with one or more of the first through sixth aspects, the TDRA is indicated by a start and length indicator value that indicates a starting time domain RB or a starting time domain RB group, and a quantity of consecutive time domain RBs or a quantity of consecutive time domain RB groups, for the TDRA.

In an eighth aspect, alone or in combination with one or more of the first through seventh aspects, the indication of the TDRA in the unit of the time domain RB or in the unit of the time domain RB group is based at least in part on a length of the TDRA being less than a threshold value.

In a ninth aspect, alone or in combination with one or more of the first through eighth aspects, the TDRA includes contiguous virtual time domain RBs or contiguous virtual time domain RB groups that map to non-contiguous physical time domain RBs or to non-contiguous physical time domain RB groups.

In a tenth aspect, alone or in combination with one or more of the first through ninth aspects, the unit of the time domain RB or the unit of the time domain RB group does not include cyclic prefix modulation symbols.

In an eleventh aspect, alone or in combination with one or more of the first through tenth aspects, the unit of the time domain RB or the unit of the time domain RB group includes guard interval modulation symbols.

In a twelfth aspect, alone or in combination with one or more of the first through eleventh aspects, a transport block size for the communication is based at least in part on a quantity of time domain resource elements included in the unit of the time domain RB and a quantity of time domain RBs or a quantity of time domain RB groups indicated by the TDRA.

In a thirteenth aspect, alone or in combination with one or more of the first through twelfth aspects, the TDRA includes one or more cyclic prefixes for the sub-symbol unit within a symbol or one or more guard intervals for the sub-symbol unit within a symbol.

In a fourteenth aspect, alone or in combination with one or more of the first through thirteenth aspects, a transport block size for the communication is based at least in part on one or more cyclic prefixes for the sub-symbol unit within a symbol or one or more guard intervals for the sub-symbol unit within a symbol.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
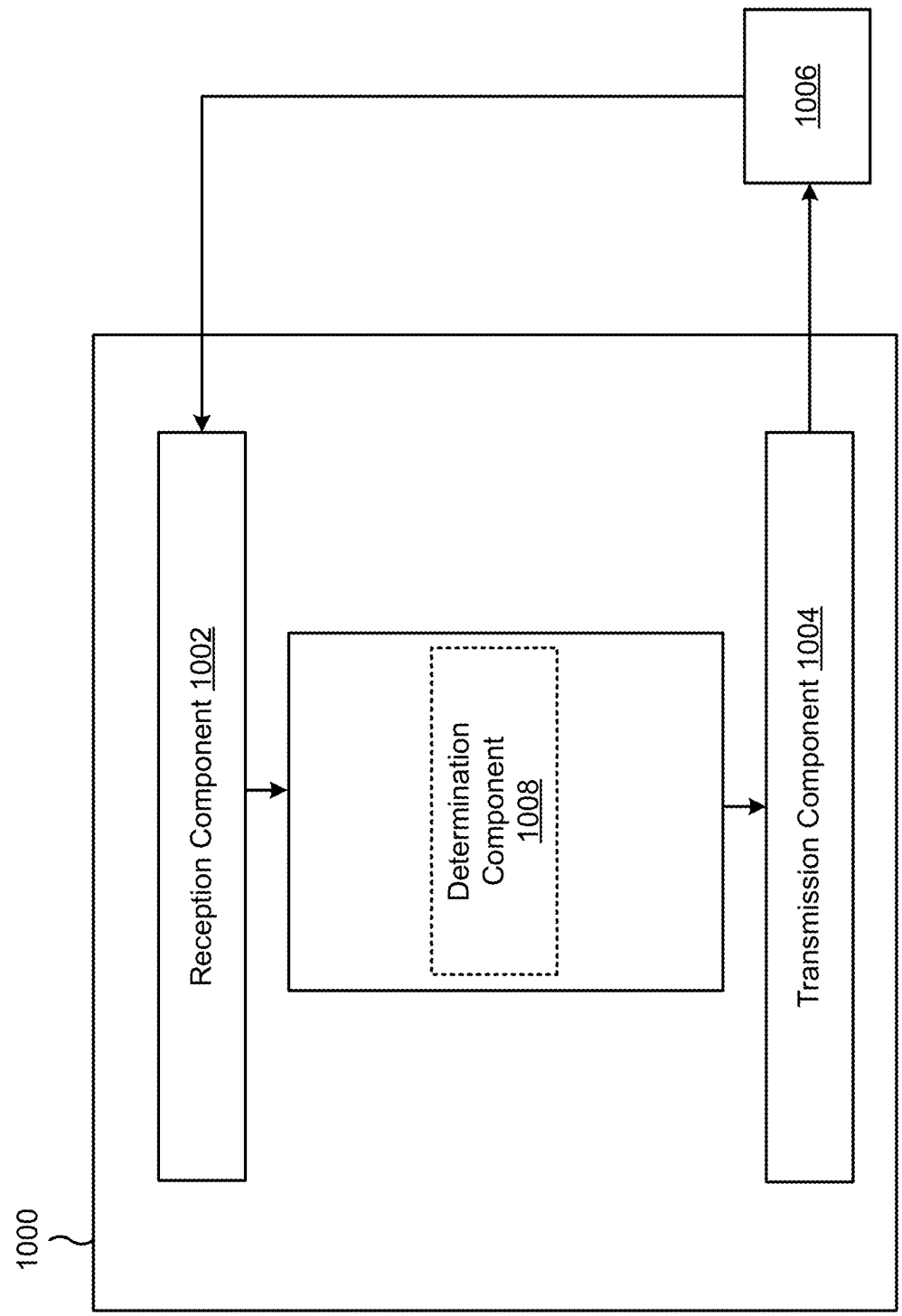
FIGS. 10-11 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a base station, an indication of a TDRA, in a unit of a time domain RB or in a unit of a time domain RB group, for a communication that is to use a time domain waveform. In some aspects, the unit of the time domain RB or the unit of the time domain RB group is a sub-symbol unit. In some aspects, the reception component 1002 may communicate with the base station, using the time domain waveform, based at least in part on the TDRA for the communication. In some aspects, the transmission component 1004 may communicate with the base station, using the time domain waveform, based at least in part on the TDRA for the communication.

The determination component 1008 may determine the TDRA based at least in part on a SLIV. The determination component 1008 may determine whether the TDRA is indicated in the unit of the time domain RB or in the unit of the time domain RB group, or in a symbol unit, based at least in part whether a start and length indicator value for the TDRA satisfies a threshold value. The determination component 1008 may determine a transport block size for the communication. In some aspects, the determination component 1008 may include a controller/processor, a memory, or a combination thereof, of the UE described above in connection with FIG. 2.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
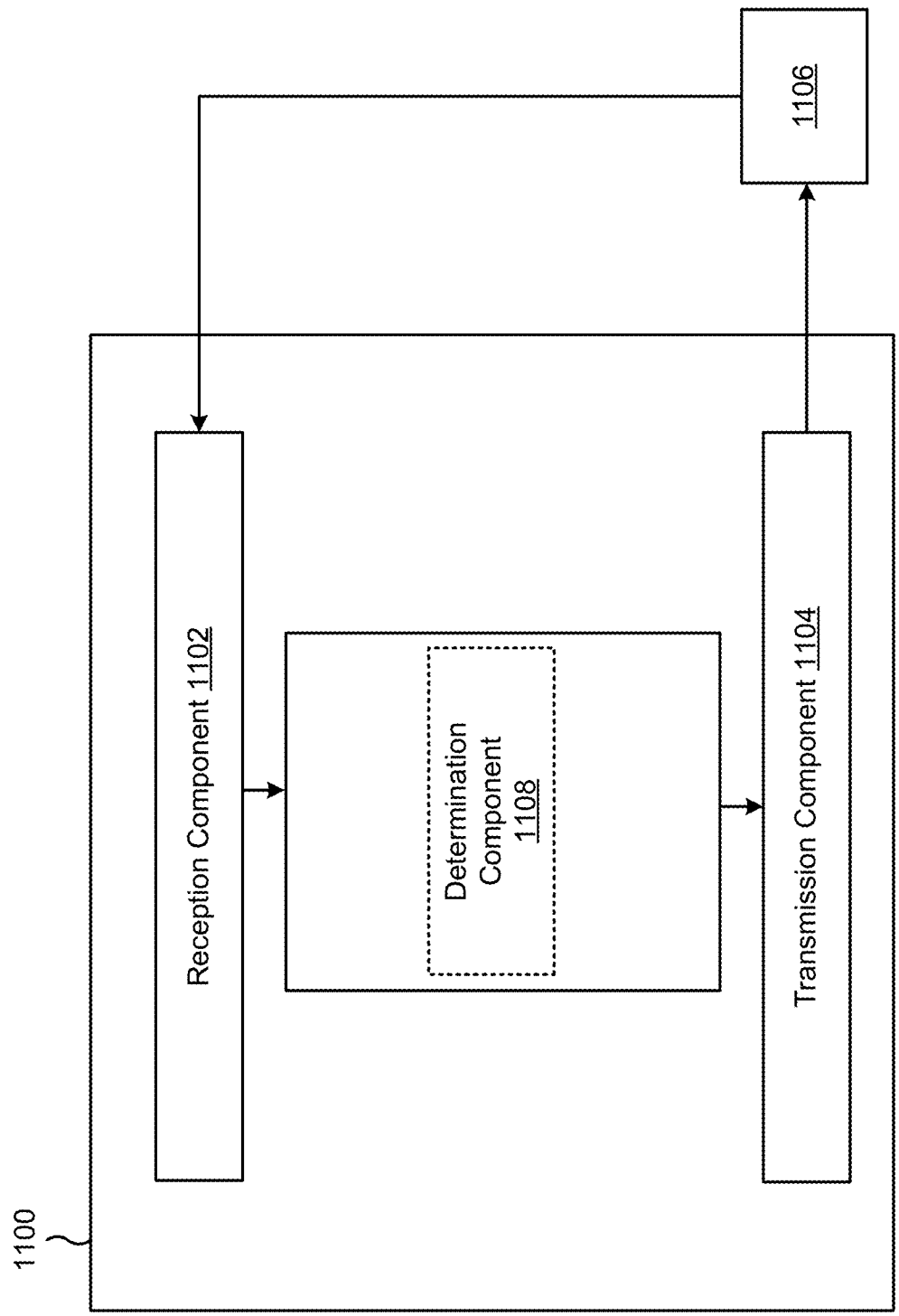

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit, to a UE, an indication of a TDRA, in a unit of a time domain RB or in a unit of a time domain RB group, for a communication that is to use a time domain waveform. In some aspects, the unit of the time domain RB or the unit of the time domain RB group is a sub-symbol unit. In some aspects, the reception component 1102 may communicate with the UE, using the time domain waveform, based at least in part on the TDRA for the communication. In some aspects, the transmission component 1104 may communicate with the UE, using the time domain waveform, based at least in part on the TDRA for the communication.

The determination component 1108 may determine the TDRA for the UE. The determination component 1108 may determine a SLIV based at least in part on the TDRA. The determination component 1108 may determine a transport block size for the communication.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a user equipment (UE), comprising: receiving, from abase station, an indication of a time domain resource allocation (TDRA), in a unit of a time domain resource block (RB) or in a unit of a time domain RB group, for a communication that is to use a time domain waveform, wherein the unit of the time domain RB or the unit of the time domain RB group is a sub-symbol unit; and communicating with the base station, using the time domain waveform, based at least in part on the TDRA for the communication.

Aspect 2: The method of Aspect 1, wherein the time domain waveform is a single carrier quadrature amplitude modulation waveform.

Aspect 3: The method of any of Aspects 1-2, wherein the unit of the time domain RB includes a plurality of time domain resource elements.

Aspect 4: The method of any of Aspects 1-3, wherein the TDRA includes contiguous time domain RBs or contiguous time domain RB groups.

Aspect 5: The method of any of Aspects 1-4, wherein a size of the unit of the time domain RB group is based at least in part on a size of a bandwidth part.

Aspect 6: The method of any of Aspects 1-5, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

Aspect 7: The method of any of Aspects 1-5, wherein the TDRA is based at least in part on a quantity of time domain RB groups included in a slot, a starting time domain RB group for the TDRA, and a quantity of consecutive time domain RB groups for the TDRA.

Aspect 8: The method of any of Aspects 1-7, wherein the TDRA is indicated by a start and length indicator value that indicates a starting time domain RB or a starting time domain RB group, and a quantity of consecutive time domain RBs or a quantity of consecutive time domain RB groups, for the TDRA.

Aspect 9: The method of any of Aspects 1-8, wherein the indication of the TDRA in the unit of the time domain RB or in the unit of the time domain RB group is based at least in part on a length of the TDRA being less than a threshold value.

Aspect 10: The method of any of Aspects 1-9, further comprising: determining whether the TDRA is indicated in the unit of the time domain RB or in the unit of the time domain RB group, or in a symbol unit, based at least in part whether a start and length indicator value for the TDRA satisfies a threshold value.

Aspect 11: The method of any of Aspects 1-10, wherein the TDRA includes contiguous virtual time domain RBs or contiguous virtual time domain RB groups that map to non-contiguous physical time domain RBs or to non-contiguous physical time domain RB groups.

Aspect 12: The method of any of Aspects 1-11, wherein the unit of the time domain RB or the unit of the time domain RB group does not include cyclic prefix modulation symbols.

Aspect 13: The method of any of Aspects 1-12, wherein the unit of the time domain RB or the unit of the time domain RB group includes guard interval modulation symbols.

Aspect 14: The method of any of Aspects 1-13, wherein a transport block size for the communication is based at least in part on a quantity of time domain resource elements included in the unit of the time domain RB and a quantity of time domain RBs or a quantity of time domain RB groups indicated by the TDRA.

Aspect 15: The method of any of Aspects 1-14, wherein the TDRA includes one or more cyclic prefixes for the sub-symbol unit within a symbol or one or more guard intervals for the sub-symbol unit within a symbol.

Aspect 16: The method of any of Aspects 1-15, wherein a transport block size for the communication is based at least in part on one or more cyclic prefixes for the sub-symbol unit within a symbol or one or more guard intervals for the sub-symbol unit within a symbol.

Aspect 17: A method of wireless communication performed by abase station, comprising: transmitting, to a user equipment (UE), an indication of a time domain resource allocation (TDRA), in a unit of a time domain resource block (RB) or in a unit of a time domain RB group, for a communication that is to use a time domain waveform, wherein the unit of the time domain RB or the unit of the time domain RB group is a sub-symbol unit; and communicating with the UE, using the time domain waveform, based at least in part on the TDRA for the communication.

Aspect 18: The method of Aspect 17, wherein the time domain waveform is a single carrier quadrature amplitude modulation waveform.

Aspect 19: The method of any of Aspects 17-18, wherein the unit of the time domain RB includes a plurality of time domain resource elements.

Aspect 20: The method of any of Aspects 17-19, wherein the TDRA includes contiguous time domain RBs or contiguous time domain RB groups.

Aspect 21: The method of any of Aspects 17-20, wherein a size of the unit of the time domain RB group is based at least in part on a size of a bandwidth part.

Aspect 22: The method of any of Aspects 17-21, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

Aspect 23: The method of any of Aspects 17-21, wherein the TDRA is based at least in part on a quantity of time domain RB groups included in a slot, a starting time domain RB group for the TDRA, and a quantity of consecutive time domain RB groups for the TDRA.

Aspect 24: The method of any of Aspects 17-23, wherein the TDRA is indicated by a start and length indicator value that indicates a starting time domain RB or a starting time domain RB group, and a quantity of consecutive time domain RBs or a quantity of consecutive time domain RB groups, for the TDRA.

Aspect 25: The method of any of Aspects 17-24, wherein the indication of the TDRA in the unit of the time domain RB or in the unit of the time domain RB group is based at least in part on a length of the TDRA being less than a threshold value.

Aspect 26: The method of any of Aspects 17-25, wherein the TDRA includes contiguous virtual time domain RBs or contiguous virtual time domain RB groups that map to non-contiguous physical time domain RBs or to non-contiguous physical time domain RB groups.

Aspect 27: The method of any of Aspects 17-26, wherein the unit of the time domain RB or the unit of the time domain RB group does not include cyclic prefix modulation symbols.

Aspect 28: The method of any of Aspects 17-27, wherein the unit of the time domain RB or the unit of the time domain RB group includes guard interval modulation symbols.

Aspect 29: The method of any of Aspects 17-28, wherein a transport block size for the communication is based at least in part on a quantity of time domain resource elements included in the unit of the time domain RB and a quantity of time domain RBs or a quantity of time domain RB groups indicated by the TDRA.

Aspect 30: The method of any of Aspects 17-29, wherein the TDRA includes one or more cyclic prefixes for the sub-symbol unit within a symbol or one or more guard intervals for the sub-symbol unit within a symbol.

Aspect 31: The method of any of Aspects 17-30, wherein a transport block size for the communication is based at least in part on one or more cyclic prefixes for the sub-symbol unit within a symbol or one or more guard intervals for the sub-symbol unit within a symbol.

Aspect 32: An apparatus for wireless communication at a device, comprising a processor; memory coupled with the processor; and instructions stored in the memory and executable by the processor to cause the apparatus to perform the method of one or more aspects of aspects 1-16.

Aspect 33: A device for wireless communication, comprising a memory and one or more processors coupled to the memory, the memory and the one or more processors configured to perform the method of one or more aspects of aspects 1-16.

Aspect 34: An apparatus for wireless communication, comprising at least one means for performing the method of one or more aspects of aspects 1-16.

Aspect 35: A non-transitory computer-readable medium storing code for wireless communication, the code comprising instructions executable by a processor to perform the method of one or more aspects of aspects 1-16.

Aspect 36: A non-transitory computer-readable medium storing a set of instructions for wireless communication, the set of instructions comprising one or more instructions that, when executed by one or more processors of a device, cause the device to perform the method of one or more aspects of aspects 1-16.

Aspect 37: An apparatus for wireless communication at a device, comprising a processor; memory coupled with the processor; and instructions stored in the memory and executable by the processor to cause the apparatus to perform the method of one or more aspects of aspects 17-31.

Aspect 38: A device for wireless communication, comprising a memory and one or more processors coupled to the memory, the memory and the one or more processors configured to perform the method of one or more aspects of aspects 17-31.

Aspect 39: An apparatus for wireless communication, comprising at least one means for performing the method of one or more aspects of aspects 17-31.

Aspect 40: A non-transitory computer-readable medium storing code for wireless communication, the code comprising instructions executable by a processor to perform the method of one or more aspects of aspects 17-31.

Aspect 41: A non-transitory computer-readable medium storing a set of instructions for wireless communication, the set of instructions comprising one or more instructions that, when executed by one or more processors of a device, cause the device to perform the method of one or more aspects of aspects 17-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, from a base station, an indication of a time domain resource allocation (TDRA), in a unit of a time domain resource block (RB) or in a unit of a time domain RB group, for a communication that is to use a time domain waveform,
         wherein the unit of the time domain RB or the unit of the time domain RB group is a sub-symbol unit; and
      communicate with the base station, using the time domain waveform, based at least in part on the TDRA for the communication.

2. The UE of claim 1, wherein the time domain waveform is a single carrier quadrature amplitude modulation waveform.

3. The UE of claim 1, wherein the unit of the time domain RB includes a plurality of time domain resource elements.

4. The UE of claim 1, wherein the TDRA includes contiguous time domain RBs or contiguous time domain RB groups.

5. The UE of claim 1, wherein a size of the unit of the time domain RB group is based at least in part on a size of a bandwidth part.

6. The UE of claim 1, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

7. The UE of claim 1, wherein the TDRA is based at least in part on a quantity of time domain RB groups included in a slot, a starting time domain RB group for the TDRA, and a quantity of consecutive time domain RB groups for the TDRA.

8. The UE of claim 1, wherein the TDRA is indicated by a start and length indicator value that indicates a starting time domain RB or a starting time domain RB group, and a quantity of consecutive time domain RBs or a quantity of consecutive time domain RB groups, for the TDRA.

9. The UE of claim 1, wherein the indication of the TDRA in the unit of the time domain RB or in the unit of the time domain RB group is based at least in part on a length of the TDRA being less than a threshold value.

10. The UE of claim 1, wherein the one or more processors are further configured to:
    determine whether the TDRA is indicated in the unit of the time domain RB or in the unit of the time domain RB group, or in a symbol unit, based at least in part whether a start and length indicator value for the TDRA satisfies a threshold value.

11. The UE of claim 1, wherein the TDRA includes contiguous virtual time domain RBs or contiguous virtual time domain RB groups that map to non-contiguous physical time domain RBs or to non-contiguous physical time domain RB groups.

12. The UE of claim 1, wherein the unit of the time domain RB or the unit of the time domain RB group does not include cyclic prefix modulation symbols.

13. The UE of claim 1, wherein the unit of the time domain RB or the unit of the time domain RB group includes guard interval modulation symbols.

14. The UE of claim 1, wherein a transport block size for the communication is based at least in part on a quantity of time domain resource elements included in the unit of the time domain RB and a quantity of time domain RBs or a quantity of time domain RB groups indicated by the TDRA.

15. The UE of claim 1, wherein the TDRA includes one or more cyclic prefixes for the sub-symbol unit within a symbol or one or more guard intervals for the sub-symbol unit within a symbol.

16. The UE of claim 1, wherein a transport block size for the communication is based at least in part on one or more cyclic prefixes for the sub-symbol unit within a symbol or one or more guard intervals for the sub-symbol unit within a symbol.

17. A base station for wireless communication, comprising:
    a memory; and
    one or more processors coupled to the memory, the one or more processors configured to:
       transmit, to a user equipment (UE), an indication of a time domain resource allocation (TDRA), in a unit of a time domain resource block (RB) or in a unit of a time domain RB group, for a communication that is to use a time domain waveform,
          wherein the unit of the time domain RB or the unit of the time domain RB group is a sub-symbol unit; and
       communicate with the UE, using the time domain waveform, based at least in part on the TDRA for the communication.

18. The base station of claim 17, wherein the time domain waveform is a single carrier quadrature amplitude modulation waveform.

19. The base station of claim 17, wherein the unit of the time domain RB includes a plurality of time domain resource elements.

20. The base station of claim 17, wherein the TDRA includes contiguous time domain RBs or contiguous time domain RB groups.

21. The base station of claim 17, wherein a size of the unit of the time domain RB group is based at least in part on a size of a bandwidth part.

22. The base station of claim 17, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

23. The base station of claim 17, wherein the TDRA is based at least in part on a quantity of time domain RB groups included in a slot, a starting time domain RB group for the TDRA, and a quantity of consecutive time domain RB groups for the TDRA.

24. The base station of claim 17, wherein the TDRA is indicated by a start and length indicator value that indicates a starting time domain RB or a starting time domain RB group, and a quantity of consecutive time domain RBs or a quantity of consecutive time domain RB groups, for the TDRA.

25. The base station of claim 17, wherein the indication of the TDRA in the unit of the time domain RB or in the unit of the time domain RB group is based at least in part on a length of the TDRA being less than a threshold value.

26. The base station of claim 17, wherein the TDRA includes contiguous virtual time domain RBs or contiguous virtual time domain RB groups that map to non-contiguous physical time domain RBs or to non-contiguous physical time domain RB groups.

27. The base station of claim 17, wherein the unit of the time domain RB or the unit of the time domain RB group does not include cyclic prefix modulation symbols.

28. The base station of claim 17, wherein the unit of the time domain RB or the unit of the time domain RB group includes guard interval modulation symbols.

29. The base station of claim 17, wherein a transport block size for the communication is based at least in part on a quantity of time domain resource elements included in the unit of the time domain RB and a quantity of time domain RBs or a quantity of time domain RB groups indicated by the TDRA.

30. The base station of claim 17, wherein the TDRA includes one or more cyclic prefixes for the sub-symbol unit within a symbol or one or more guard intervals for the sub-symbol unit within a symbol.

31. The base station of claim 17, wherein a transport block size for the communication is based at least in part on one or more cyclic prefixes for the sub-symbol unit within a symbol or one or more guard intervals for the sub-symbol unit within a symbol.

32. A method of wireless communication performed by a user equipment (UE), comprising:
receiving, from a base station, an indication of a time domain resource allocation (TDRA), in a unit of a time domain resource block (RB) or in a unit of a time domain RB group, for a communication that is to use a time domain waveform,
wherein the unit of the time domain RB or the unit of the time domain RB group is a sub-symbol unit; and
communicating with the base station, using the time domain waveform, based at least in part on the TDRA for the communication.

33. The method of claim 32, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

34. The method of claim 32, wherein the TDRA is based at least in part on a quantity of time domain RB groups included in a slot, a starting time domain RB group for the TDRA, and a quantity of consecutive time domain RB groups for the TDRA.

35. The method of claim 32, further comprising:
determining whether the TDRA is indicated in the unit of the time domain RB or in the unit of the time domain RB group, or in a symbol unit, based at least in part whether a start and length indicator value for the TDRA satisfies a threshold value.

36. The method of claim 32, wherein the TDRA includes contiguous virtual time domain RBs or contiguous virtual time domain RB groups that map to non-contiguous physical time domain RBs or to non-contiguous physical time domain RB groups.

37. The method of claim 32, wherein the TDRA includes one or more cyclic prefixes for the sub-symbol unit within a symbol or one or more guard intervals for the sub-symbol unit within a symbol.

38. A method of wireless communication performed by a base station, comprising:
transmitting, to a user equipment (UE), an indication of a time domain resource allocation (TDRA), in a unit of a time domain resource block (RB) or in a unit of a time domain RB group, for a communication that is to use a time domain waveform,
wherein the unit of the time domain RB or the unit of the time domain RB group is a sub-symbol unit; and
communicating with the UE, using the time domain waveform, based at least in part on the TDRA for the communication.

39. The method of claim 38, wherein the TDRA is based at least in part on a quantity of symbols included in a slot, a quantity of time domain RBs included in a symbol of the quantity of symbols, a starting time domain RB for the TDRA, and a quantity of consecutive time domain RBs for the TDRA.

40. The method of claim 38, wherein the TDRA is based at least in part on a quantity of time domain RB groups included in a slot, a starting time domain RB group for the TDRA, and a quantity of consecutive time domain RB groups for the TDRA.

41. The method of claim 38, wherein the TDRA includes contiguous virtual time domain RBs or contiguous virtual time domain RB groups that map to non-contiguous physical time domain RBs or to non-contiguous physical time domain RB groups.

42. The method of claim 38, wherein the TDRA includes one or more cyclic prefixes for the sub-symbol unit within a symbol or one or more guard intervals for the sub-symbol unit within a symbol.

* * * * *